(12) United States Patent
Lyle (10) Patent No.: US 11,947,351 B1
(45) Date of Patent: Apr. 2, 2024

(54) SYSTEMS AND METHODS FOR AUTONOMOUS VEHICLE RISK MANAGEMENT

(71) Applicant: United Services Automobile Association (USAA), San Antonio, TX (US)

(72) Inventor: Ruthie Lyle, Durham, NC (US)

(73) Assignee: United Services Automobile Association (USAA), San Antonio, TX (US)

( * ) Notice: Subject to any disclaimer, the term of this patent is extended or adjusted under 35 U.S.C. 154(b) by 35 days.

(21) Appl. No.: 17/329,954

(22) Filed: May 25, 2021

Related U.S. Application Data

(63) Continuation of application No. 16/005,274, filed on Jun. 11, 2018, now Pat. No. 11,036,221.

(60) Provisional application No. 62/518,254, filed on Jun. 12, 2017.

(51) Int. Cl.
*G05D 1/00* (2006.01)
*G06Q 40/08* (2012.01)

(52) U.S. Cl.
CPC ......... *G05D 1/0055* (2013.01); *G05D 1/0088* (2013.01); *G06Q 40/08* (2013.01)

(58) Field of Classification Search
CPC ..... G05D 1/0055; G05D 1/0088; G06Q 40/08
See application file for complete search history.

(56) References Cited

U.S. PATENT DOCUMENTS

| | | | |
|---|---|---|---|
| 11,036,221 B1* | 6/2021 | Lyle | G05D 1/0055 |
| 2009/0037093 A1 | 2/2009 | Kurihara et al. | |
| 2015/0066345 A1* | 3/2015 | Cheatham, III | G08G 1/166 701/301 |
| 2015/0292894 A1* | 10/2015 | Goddard | G01C 21/3453 701/400 |
| 2017/0135621 A1* | 5/2017 | Lee | A61B 5/18 |
| 2017/0334450 A1 | 11/2017 | Shiraishi et al. | |
| 2017/0369052 A1 | 12/2017 | Nagy et al. | |
| 2018/0075538 A1* | 3/2018 | Konrardy | G06Q 40/08 |
| 2019/0241198 A1 | 8/2019 | Mori et al. | |

* cited by examiner

*Primary Examiner* — Aaron L Troost
(74) *Attorney, Agent, or Firm* — Fletcher Yoder, P.C.

(57) ABSTRACT

A system for use with an autonomous vehicle includes one or more processors configured to receive one or more inputs from a driver and to control the autonomous vehicle based on the one or more inputs. Each input is indicative of an anticipated driver response to a driving incident.

20 Claims, 3 Drawing Sheets

SYSTEMS AND METHODS FOR AUTONOMOUS VEHICLE RISK MANAGEMENT

CROSS-REFERENCE TO RELATED APPLICATION

This application is a continuation of U.S. patent application Ser. No. 16/005,274, entitled "SYSTEMS AND METHODS FOR AUTONOMOUS VEHICLE RISK MANAGEMENT," filed Jun. 11, 2018, which claims priority to and the benefit of U.S. Provisional Application No. 62/518,254, entitled "SYSTEMS AND METHODS FOR AUTONOMOUS VEHICLE RISK MANAGEMENT," filed Jun. 12, 2017. These applications are hereby incorporated by reference in their entireties for all purposes.

BACKGROUND

The present disclosure relates generally to autonomous vehicles. More specifically, the present disclosure relates to managing operational aspects and provision of insurance for autonomous vehicles based at least in part on user input.

Some vehicles (e.g., autonomous vehicles) are capable of controlling driving operations of the vehicle, such that a person may not interact or control the vehicle as the vehicle drives to a destination. In such vehicles, a vehicle control system may control the driving operations of the vehicle based on a set of algorithms. It is now recognized that improvements in the generation of the set of algorithms and the provision of insurance for such vehicles is needed.

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

SUMMARY

In one embodiment, a system for use with an autonomous vehicle includes one or more processors configured to receive one or more inputs from a driver and to control the autonomous vehicle based on the one or more inputs. Each input is indicative of an anticipated driver response to a driving incident.

In one embodiment, a system for use with an autonomous vehicle includes one or more processors configured to provide a plurality of prompts to a driver via an output device, wherein each prompt is related to a respective potential driving scenario. The one or more processors are also configured to receive a plurality of inputs from the driver in response to the plurality of prompts, wherein each input is indicative of an anticipated driver response to the respective potential driving scenario. The one or more processors are further configured to determine an insurance cost for the autonomous vehicle based on the one or more inputs.

In one embodiment, a method of controlling an autonomous vehicle includes receiving, at one or more processors, one or more inputs from a driver of the autonomous vehicle. The method also includes generating, using the one or more processors, at least one driver-specific algorithm based on one or more inputs received from the driver. The method further includes controlling, using the one or more processors, the autonomous vehicle based on the at least one driver-specific algorithm.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As noted above, some vehicles (e.g., autonomous vehicles) are capable of controlling driving operations of the vehicle, such that a person may not interact or control the vehicle as the vehicle drives to a destination. In such vehicles, a vehicle control system may control the driving operations of the vehicle based on a set of algorithms. However, the set of algorithms may be the same for each vehicle and/or may not be specifically tuned or adapted for the driver who owns or operates the vehicle. Thus, in some circumstances, the vehicle control system may not control the vehicle in a manner that corresponds to the anticipated driver's response (e.g., driver's anticipated, expected, or preferred response; the manner in which the driver would respond, expect to respond, tend to respond, or prefer to respond if the driver had full control of the vehicle). For example, when confronted with an unavoidable accident, the vehicle control system may control the vehicle to swerve one way into a fence, thereby damaging the property owned by a third-party and generally preserving the vehicle. However, when confronted with the same set of circumstances, the driver may respond by swerving another way into a ditch, thereby more significantly damaging the vehicle and preserving the fence. The system disclosed herein may be configured to receive inputs indicative of the anticipated driver response to various driving incidents (e.g., events, scenarios, or unavoidable accidents) and to control the vehicle based on the inputs. In some embodiments, the system may be configured to determine and/or adjust an insurance policy (e.g., insurance cost/rate) for the vehicle based on the inputs.

Figure 1:
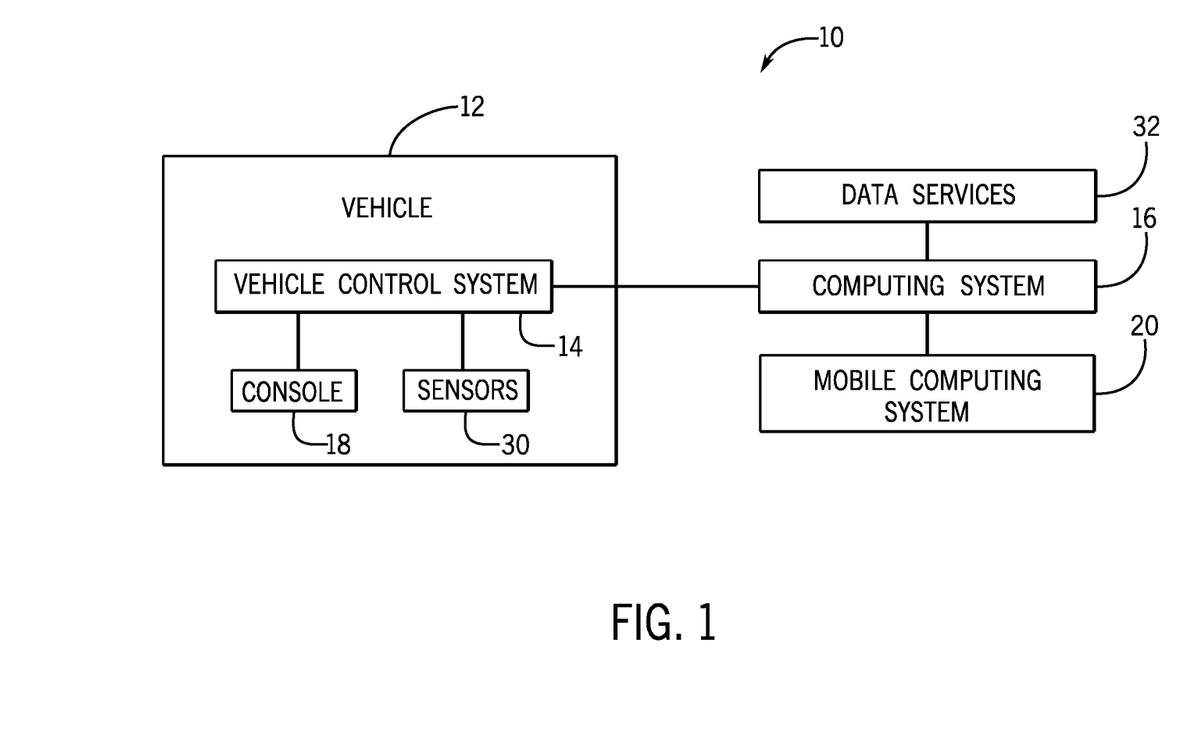
FIG. 1 illustrates a block diagram of a system that may be used with a vehicle, in accordance with embodiments described herein.

With the foregoing in mind, FIG. 1 illustrates a block diagram of a system 10 that may be configured to control a vehicle 12 (e.g., autonomous vehicle) based on an anticipated driver response to a driving incident. In some embodiments, the system 10 may be configured to determine and/or adjust an insurance policy (e.g., an insurance cost/rate) for the vehicle 12 based on the anticipated driver response. It should be appreciated that the vehicle 12 may be any suitable vehicle (e.g., car, van, truck, farming equipment, construction equipment), and may be partially or fully controlled and operated via a processor-based device, such as a vehicle control system 14.

The anticipated driver response to the driving incident may be input by the driver and/or may be determined by a computing system 16 (e.g., computational platform) in any of a variety of manners. For example, in some embodiments, the computing system 16 may be configured to provide one or more prompts to the driver, such as via a console 18 (e.g., touchscreen display) in the vehicle 12 or via a mobile computing device 20 (e.g., mobile phone, tablet, or the like). The one or more prompts may include questions related to a potential driving incident or scenario. For example, the prompt may describe a scenario in which the driver is driving between 15 to 20 kilometers per hour, and another vehicle swerves into the driver's lane so that the driver cannot avoid an accident. The prompt may provide options for the driver to select, such as (1) swerve to the left to hit a fence of a residential property, thereby damaging the fence and generally preserving the vehicle; or (2) swerve to the right into a ditch, thereby more significantly damaging the vehicle 12 and preserving the fence. The driver's selection indicates the anticipated driver response to the described driving incident. Furthermore, selection of option (1) may indicate that the driver has a tendency or preference for preserving the vehicle 12, while driver selection of option (2) may indicate that the driver has a tendency or preference for preserving structures owned by third parties. The computing system 16 may provide multiple prompts (e.g., more than 10, 20, 30, 40, 50, or 100 prompts) to the driver to collect information indicative of the anticipated driver's response to various driving incidents. In some cases, the selections or inputs to the multiple prompts may together indicate various driver tendencies and/or preferences, such as swerving in a particular direction, braking under certain conditions, preserving third-party property, preserving the vehicle 12, reducing impact or forces on the vehicle 12 or at certain locations of the vehicle 12 (e.g., driver side or passenger side), or the like.

In operation, if the same or similar situation arises during autonomous operation of the vehicle 12, the vehicle control system 14 will control the vehicle 12 based on the driver's input to the relevant prompts. In some embodiments, the computing system 16 may be configured to analyze the driver's responses to multiple prompts to determine the anticipated driver's response to various driving incidents and to adjust default algorithms and/or to generate a unique set of algorithms (e.g., driver-specific algorithms or rules) to control the vehicle 12 based on the determined anticipated driver's response. In this way, the vehicle control system 14 may control the vehicle 12 in a driver-specific manner upon occurrence of certain driving incidents, such as unavoidable accidents, for example. In some embodiments, the system 16 may be configured to provide new or updated prompts periodically (e.g., every day, week, month, or year) and/or in response to certain events (e.g., news events or reported incidents). For example, an actual accident in the news may be reported via the console 18 and used as the basis for a prompt.

In some cases, the anticipated driver's response may vary based on other factors, such as passengers present in the car. For example, if the driver's child is in the car, the driver may select option (1) to swerve to the left to hit the fence, thereby damaging the fence, rather than option (2) to swerve to the right into the ditch, thereby more significantly damaging the vehicle 12, to reduce impact or forces on the vehicle 12 or to avoid impact on the passenger side of the vehicle 12. Accordingly, the computing system 16 may be configured to provide prompts that include scenarios in which only the driver is in the vehicle 12 and scenarios in which passengers (e.g., various types of passengers or specific passengers, such as the driver's child or children, multiple unrelated children, other adults) are in the vehicle 12. Then, the computing system 16 may generate multiple unique sets of algorithms (e.g., driver-specific algorithms or rules) that may be accessed, selected, and/or used to control the vehicle 12 under various conditions. For example, the computing system 16 may generate a first set of algorithms that are used when only the driver is in the vehicle 12 and a second set of algorithms that are used when the driver and the driver's child are in the vehicle 12. In this manner, each algorithm may correspond to, and be appropriate for use under, certain conditions. Technology, such as facial recognition (e.g., using a camera integrated with the system 10) may be employed to identify vehicle occupants for algorithm decision-making purposes.

In some such embodiments, the computing system 16 may be configured to receive an indication of the occupants (e.g., driver and passengers) in the vehicle 12, such as each time the vehicle 12 is turned on (e.g., at the beginning of each driving trip). In some embodiments, the computing system 16 may be configured to prompt the driver to input an indication of the occupants and/or to receive the indication of the occupants via a driver input at the console 18 or the mobile computing system 20, for example. In some embodiments, the computing system 16 may be configured to receive the indication of the occupants of the vehicle 12 from one or more sensors 30 associated with the vehicle 12. For example, the one or more sensors 30 may include machine-vision sensors (e.g., imaging sensors, cameras, optical sensors) within the vehicle 12 that monitor the presence and/or identity of a driver in the driver seat and/or a passenger in the passenger seat. The one or more sensors 30 may additionally or alternatively include load sensors or thermal sensors at the driver seat and/or the passenger seat to detect the presence and/or identity of a driver in the driver seat and/or a passenger in the passenger seat, respectively. The one or more sensors 30 may additionally or alternatively include finger-print scanners, voice recognition sensors, or the like that are configured to detect the presence and/or the identity of the driver and/or the passenger or to facilitate input of the driver information and/or the passenger information to the computing system 16. The one or more sensors 30 may be disposed at various locations within the vehicle 12 such as the steering wheel, dashboard, seat, armrest, mirrors, and the like. In certain embodiments, such sensors 30 may be disposed on devices carried by or worn by the driver or passengers. For example, such sensors 30 may be disposed on mobile phones, wearable electronics, or the like. In this way, the computing system 16 may be able to detect the presence of and/or to determine the identity of occupants of the vehicle 12, select the appropriate algorithms (e.g., from the multiple sets of algorithms), and provide the appropriate algorithms to the vehicle control system 14 to control the vehicle 12 in accordance with the anticipated driver's response and based on the passenger(s) within the vehicle 12.

Similarly, the types of potential driving incidents may vary based on road conditions and/or weather conditions and/or the anticipated driver's response may vary based on road conditions and/or weather conditions. For example, under icy road conditions, unavoidable accidents may be more likely. Thus, the computing system 16 may provide unique prompts or additional prompts that relate to driving incidents or scenarios that may occur under certain road conditions and/or weather conditions. In this manner, the computing system 16 may generate multiple unique sets of algorithms (e.g., driver-specific algorithms or rules) to control the vehicle 12 based on the driver's anticipated response in particular road conditions and/or weather conditions. For example, the computing system 16 may generate a first set of algorithms that are used under normal road conditions and a second set of algorithms that are used under icy road conditions.

In some such embodiments, the computing system 16 may be configured to receive an indication of the road conditions and/or weather conditions when the vehicle 12 is turned on (e.g., at the beginning of each driving trip) or as the vehicle 12 drives to a destination. The computing system 16 may receive the indication of the road conditions and/or weather conditions via the sensors 30 and/or a driver input at the console 18 or the mobile computing system 20, for example. In some embodiments, the computing system 16 may be configured to receive the indication of road conditions and/or weather conditions from one or more data services 32, which may include one or more databases, websites, or information collection organizations that acquire data. For instance, the data services 32 may include social media websites that are updated to indicate conditions in the vicinity of the vehicle 12. In some instances, the social media data may include information regarding a natural disaster, road conditions, weather conditions, and the like. In addition, the data services 32 may include electronic news sources that may be updated in real time or near real time via a network (e.g., Internet). The electronic news sources may provide information regarding weather alerts, natural disaster alerts, and any other information that may be published via an electronic news outlet such as a webpage, news database, or the like. Road condition information may also include information regarding whether construction is present along a traveled path or route, recent accidents, and the like.

It should be appreciated that the anticipated driver's response may vary based on other factors, such as, but not limited to, the vehicle 12 (e.g., type, size, value, performance ratings), traffic conditions, time of day, and/or crime conditions in the area. For example, with reference to the above-noted exemplary prompt, the driver may choose option (1) to swerve into the fence, rather than option (2) to swerve into the ditch, if it is late at night and/or if the vehicle 12 is in a high-crime area, so that the vehicle 12 will be capable of driving away from the area and to avoid the risk of being stranded at night and/or in the high-crime area. Accordingly, the computing system 16 may provide prompts and may generate multiple sets of algorithms for such factors, and then access, select, and use the appropriate algorithms (e.g., from the multiple sets of algorithms) based on data related to the vehicle 12, traffic conditions, time of day, local crime, or the like, from the driver, data services 32, or any other suitable source, during operation of the vehicle 12.

Each driver may have their own driver-specific algorithms that may be accessed from the computing system 16 (e.g., cloud computing system) and used to control any vehicle 12 driven by the driver. Thus, one vehicle 12 may be controlled using the driver's driver-specific algorithms derived at least in part from the driver's responses to the prompts, and another vehicle 12 may be controlled using the same driver-specific algorithms. In some cases, the driver may have their own driver-specific algorithms for each vehicle 12. Thus, a first vehicle 12 may be controlled using the driver's driver-specific algorithms derived at least in part from the driver's responses to prompts presented for the first vehicle 12, and a second vehicle 12 may be controlled using the driver's other driver-specific algorithms derived at least in part from the driver's response to prompts presented for the second vehicle 12. In such cases, the driver-specific algorithms may also be considered to be vehicle-specific algorithms.

In some embodiments, the driver (e.g., owner; primary driver; authorized person or entity) of the vehicle 12 may set or establish driver-specific algorithms and also instruct the computing system 16 to use these driver-specific algorithms for all drivers of the vehicle 12 (e.g., at all times) or for at least some drivers of the vehicle 12 (e.g., the driver and/or other drivers who have not established driver-specific algorithms by answering prompts, unauthorized or infrequent drivers, or inexperienced drivers, such as a child of the driver). Thus, the vehicle 12 may be controlled using the driver's driver-specific algorithms derived at least in part from the driver's responses to prompts presented for the vehicle 12 for multiple different drivers. In such cases, the algorithms may also be considered to be vehicle-specific algorithms.

Additionally or alternatively, the driver (e.g., owner; primary driver; authorized person or entity) may set or establish rules or limits for the driver-specific algorithms via an input into the computing system 16. Thus, certain prompts may be answered by the driver and/or certain prompts may not be provided to other drivers of the vehicle 12. For example, if the driver wants the vehicle 12 to always demonstrate a preference to preserve third party property, the driver may answer the relevant prompt(s) and block other driver's from providing inputs that would result in the vehicle 12 being controlled in a different manner. The ability to set or establish driver-specific algorithms as set forth above may allow the driver (e.g., owner; primary driver; authorized person or entity) of the vehicle 12 to control or influence insurance costs for the vehicle 12, as discussed in more detail below. In such cases, the driver-specific algorithms may also be considered to be vehicle-specific algorithms.

Various entities may also wish to set or establish the algorithms that are used to control the vehicle 12 for all drivers of the vehicle 12 (e.g., at all times), for at least some drivers of the vehicle 12, and/or for all or some drivers of a fleet of vehicles 12. For example, a truck driving company may set or establish algorithms by having one or more experienced drivers answer the prompts, and then instructing the computing system 16 to use the algorithms to control all trucks in the fleet owned by the truck driving company. This may also allow the truck driving company to control or influence insurance costs for the fleet, as discussed in more detail below. As used herein, the driver is a human operator that may sit in a driver's seat (e.g., driver's position) or be otherwise positioned to take over control of the vehicle 12 from the vehicle control system 14 at certain times, a human operator or entity that owns the vehicle 12, and/or a human operator or entity that otherwise assumes a lead role with respect to operation of the vehicle 12 as the vehicle 12 travels, for example.

It should be appreciated that components of the computing system 16 may be located at any suitable location, including within the vehicle 12 or at a remote location. The computing system 16 may include or be part of a supercomputer that utilizes multiple computing systems 16, a cloud computing system, or the like, and it should be understood that all or some of the processing functions described herein with respect to the computing system 16 may be carried out by the vehicle control system 14 within the vehicle 12 or any other suitable computing system.

In some embodiments, the computing system 16 may be configured to determine and/or to adjust the insurance policy for the vehicle 12 based on the inputs to the one or more prompts and/or the anticipated driver response. It should be appreciated that the insurance cost and/or insurance cost adjustments may vary based on any of a variety of additional factors, such as occupants (e.g., driver and passengers) in the car, value of the vehicle, type of vehicle, driving location, or the like. In some embodiments, the insurance cost may automatically increase if the inputs from the driver and/or the algorithms that will be used to control the vehicle 12 will result in increased property damage or costs during operation of the vehicle 12. For example, if the vehicle 12 is an expensive vehicle, selection of option (1) to swerve into the fence may be less costly than option (2) to swerve into the ditch. Accordingly, if the driver selects, option (2) and/or provides multiple inputs that will cause the vehicle control system 14 to control the vehicle to respond to various driving incidents in a manner that damages the vehicle 12, the insurance cost may increase (e.g., from a baseline or default cost). However, if the vehicle 12 is an inexpensive vehicle or does not have collision coverage, selection of option (2) to swerve into the ditch may be less costly than option (1) to swerve into the fence. Accordingly, if the driver selects option (2) and/or provides multiple inputs that will cause the vehicle control system 14 to control the vehicle 12 to respond to various driving incidents in a manner that damages the vehicle 12, the insurance cost may decrease (e.g., from a baseline or default rate).

In some embodiments, the insurance cost may automatically adjust in response to new inputs indicative of the anticipated driver's response and/or data indicative of certain conditions. In this manner, the insurance cost may be periodically adjusted based on the driver's inputs and/or changes in conditions (e.g., occupants, road conditions). It should be appreciated that the computing system 16 may be configured to adjust and apply insurance costs based on time (e.g., dollars per minutes, hours, or days) or based on a distance traveled (e.g., dollars per kilometers). That is, the insurance cost may be applied on a per unit of time basis or may be applied on a per unit of distance basis. For example, if the conditions that result in the higher cost (e.g., recent inputs, occupants) persists for five hours, the higher insurance cost will be applied for the five hours. However, in some embodiments, if vehicle travels two kilometers while the higher cost exists (e.g., due to the most recent inputs, occupants), the higher insurance cost will be applied for the two miles.

In some embodiments, the insurance computing system 16 may be configured to provide an indication (e.g., a numerical value) of the insurance cost to the driver via an output device, such as via the console 18 within the vehicle 12 or via the mobile computing system 20. The indication may be provided at certain times (e.g., when the vehicle 12 is turned on or when a destination is reached, as determined by a global positioning system [GPS]), each time the driver provides an input indicative of the anticipated driver response, each time the occupancy of the vehicle changes, each time the insurance cost changes, each time the insurance cost changes by more than a certain percentage (e.g., by more than 5, 10, 15, 20, 25, or 50 percent), or continuously. For example, each time the driver turns on the vehicle 12 or otherwise activates the computing system 16, the computing system 16 may analyze the data from the sensors 30, data services 32, and/or the mobile computing system 20, to determine the appropriate algorithms to control the vehicle 12 and the associated insurance cost, and the computing system 16 may provide the indication of the insurance cost to the driver. In this manner, the driver may know the insurance cost that will be applied as the vehicle 12 travels to its destination.

In some embodiments, this insurance cost may be applied for the entire trip (e.g., until the engine of the vehicle 12 is turned off), for a certain period of time (e.g., 1, 2, 3, or 6 months or 1, 12, 24, or 48 hours), or until the driver provides different inputs indicative of the anticipated driver's response to the computing system 16. However, in some embodiments, the computing system 16 may be configured to continuously or periodically update the insurance cost during the trip or throughout the day, and the indication of the insurance cost may be provided at each change or continuously, for example. In some embodiments, the computing system 16 may estimate or predict changes to the insurance cost that may occur during the trip (e.g., based on inputs of a target destination, as well as traffic, weather, and/or crime along the route to the target destination), and the computing system 16 may provide an indication of the estimated insurance cost for a particular planned or upcoming trip to the driver (e.g., when the vehicle 12 is turned on). In some embodiments, the computing system 16 may be configured to provide a periodic cost (e.g., daily, monthly, weekly, yearly) based on the inputs indicative of the anticipated driver's response and the expected application of the various sets of algorithms to control the vehicle 12. For example, the inputs indicative of the anticipated driver's response may result in a relatively low insurance cost when only the driver is present in the vehicle 12, but may result in a relatively high insurance cost when the driver and the driver's child is present in the vehicle 12. In such circumstances, the computing system 16 may set the periodic cost based on the ratio between the expected time or distance that the vehicle 12 will operate under the first set of algorithms with only the driver present in the vehicle 12 and the expected time or distance that the vehicle 12 will operate under the second set of algorithms with the driver and the driver's child present in the vehicle 12.

In some embodiments, the computing system 16 may be configured to provide an indication of reasons for the current insurance cost or factors that may be addressed by the driver to lower the insurance cost (e.g., make selections that preserve the vehicle 12, make selections that preserve property owned by others). Although the indications have been described as being displayed on a display, it should be noted that the various indications (e.g., an indication of the insurance cost or a change in the insurance cost) may be provided in an audible format via a speaker within the vehicle 12 or by any suitable means including a vibration provided at the hands, feet, or other body part of the driver, or a combination of the various indications described herein.

Figure 2:
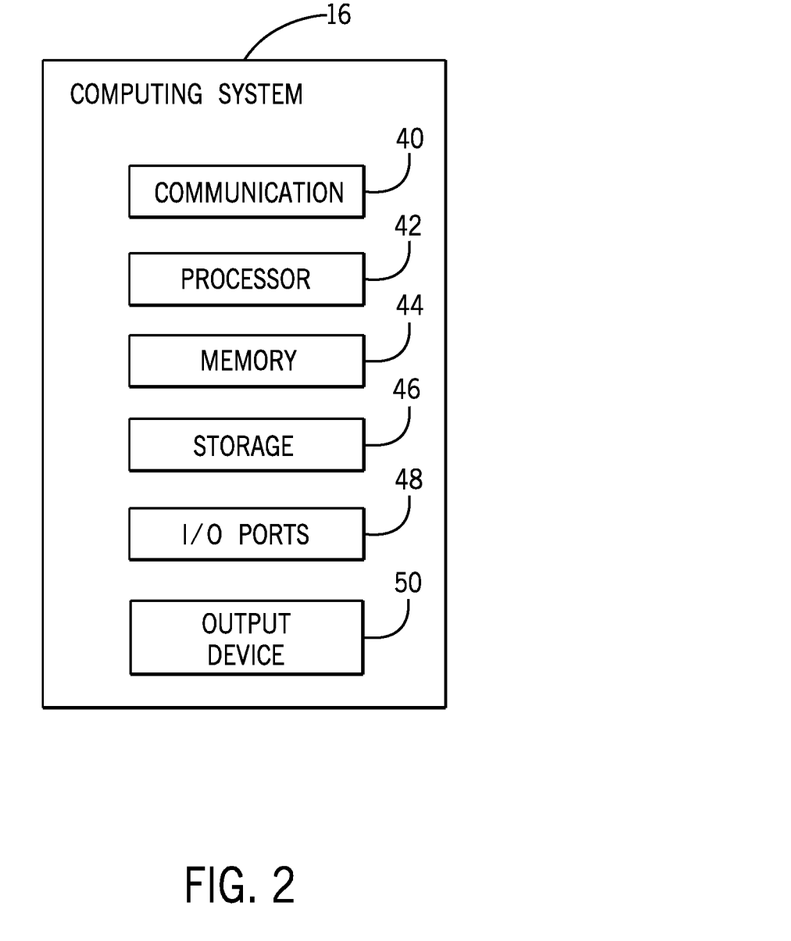
FIG. 2 illustrates a block diagram of components that may be part of a computing system of the system of FIG. 1, in accordance with embodiments described herein.

The computing system 16 may include certain components to facilitate these actions. FIG. 2 is a block diagram of example components within the computing system 16. For example, the computing system 16 may include a communication component 40, a processor 42, a memory 44, a storage 46, input/output (I/O) ports 48, an output device 50 (e.g., a display or a speaker), or any of a variety of other components that enable the computing system 16 to carry out the techniques described herein. The communication component 40 may be a wireless or wired communication component that may facilitate communication between the vehicle control system 14, the sensors 30, the data services 32, and the mobile computing system 20.

The processor 42 may be any suitable type of computer processor or microprocessor capable of executing computer-executable code. The processor 42 may also include multiple processors that may perform the operations described below. The memory 44 and the storage 46 may be any suitable articles of manufacture that can serve as media to store processor-executable code, data, or the like. These articles of manufacture may represent computer-readable media (e.g., any suitable form of memory or storage) that may store the processor-executable code used by the processor 42 to perform the presently disclosed techniques. The memory 44 and the storage 46 may also be used to store the data (e.g., the driver-specific algorithms), various other software applications, and the like. The memory 44 and the storage 46 may represent non-transitory computer-readable media (e.g., any suitable form of memory or storage) that may store the processor-executable code used by the processor 42 to perform various techniques described herein. It should be noted that non-transitory merely indicates that the media is tangible and not a signal.

The I/O ports 48 may be interfaces that may couple to other peripheral components such as input devices (e.g., keyboard, mouse), sensors, input/output (I/O) modules, and the like. The output device 50 may operate to depict indications associated with software or executable code processed by the processor 42. In one embodiment, the output device 50 may be an input device. For example, the output device 50 may include a touch display capable of receiving inputs from a user of the computing system 16. The output device 50 may be any suitable type of display, such as a liquid crystal display (LCD), plasma display, or an organic light emitting diode (OLED) display, for example. In one embodiment, the output device 50 may depict or otherwise provide the indications described above regarding the insurance cost.

It should be noted that the components described above with regard to the computing system 16 are exemplary components and the computing system 16 may include additional or fewer components as shown. Additionally, it should be noted that the vehicle control system 14 and the mobile computing system 20 may also include similar components as described as part of the computing system 16 (e.g., respective communication devices, processors, memories, storage, ports, output devices) to facilitate the disclosed operation of the system 10. For example, the processor 42 of the computing system 16 may generate algorithms based on the anticipated driver response and provide the algorithms to the vehicle control system 14 to enable the vehicle control system 14 to control the vehicle 12 in accordance with the anticipated driver's response. With the foregoing in mind, additional details with regard to controlling the vehicle 12 and determining the insurance costs are discussed below with reference to FIG. 3.

Figure 3:
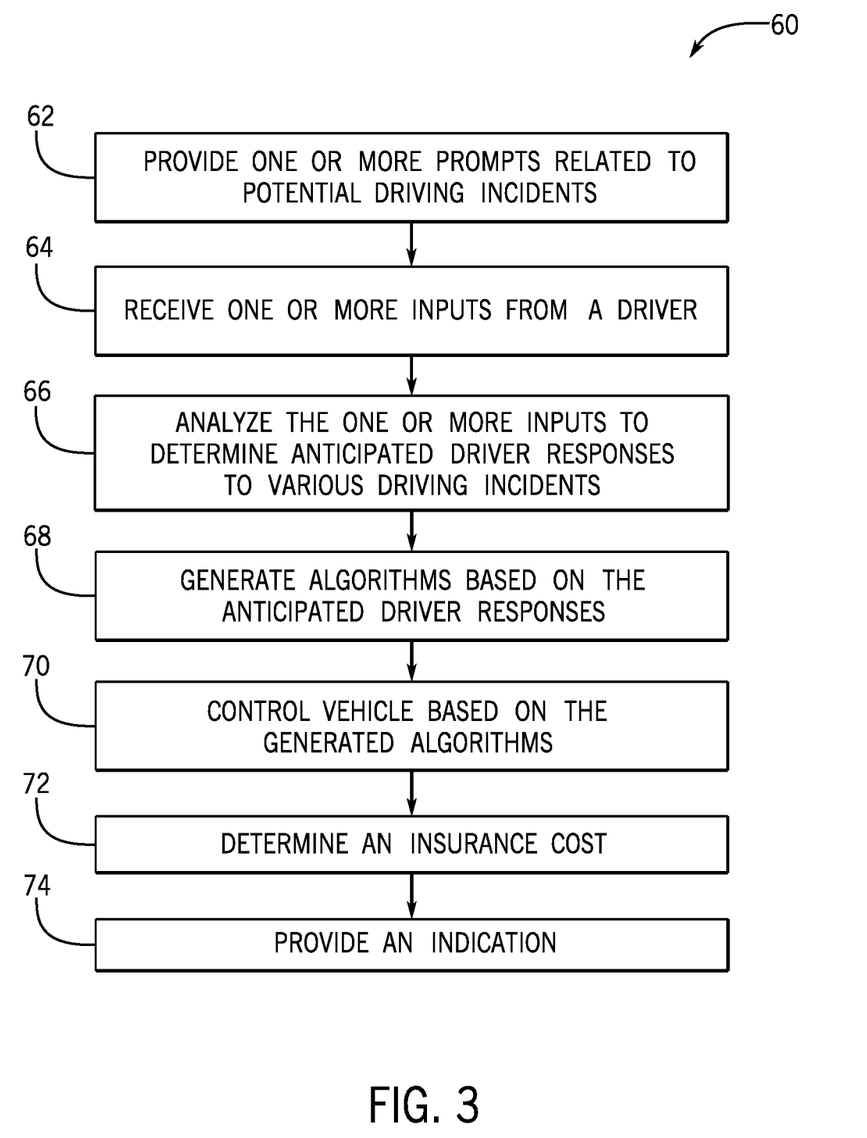
FIG. 3 illustrates a flow chart of a method for controlling the vehicle and determining an insurance cost using the system of FIG. 1, in accordance with embodiments described herein.

FIG. 3 illustrates a flow chart of a method 60 for controlling the vehicle 12 and determining an insurance policy for the vehicle 12. The following description of the method 60 is described as being performed by the system 10, but it should be noted that any suitable processor-based device may be specially programmed to perform any or all of the steps of the method 60. Furthermore, the steps of the method 60 may be performed by different processor-based devices. For example, some steps may be performed by the computing system 16, and some steps may be performed by the vehicle control system 14. Moreover, although the following description of the method 60 is described in a particular order, it should be understood that the method 60 may be performed in any suitable order, certain steps may be omitted, and other steps may be added.

At block 62, the computing system 16 may provide one or more prompts related to potential driving incidents. Such prompts may be provided via the console 18 of the vehicle 12, the mobile computing device 20, or any other suitable device. At block 64, the computing system 16 may receive one or more inputs from the driver in response to the prompts, and each input may be indicative of anticipated driver responses. At block 66, the computing system 16 may analyze the inputs to determine anticipated driver responses to various driving incidents. At block 68, the computing system 16 may generate and/or adjust algorithms based on the anticipated driver responses. In block 70, the computing system 16 may instruct the vehicle control system 14 to control the vehicle 12 in accordance with the algorithms and/or the vehicle control system 14 may utilize the algorithms to control the vehicle 12 during operation of the vehicle 12.

As discussed above with respect to FIG. 1, in some embodiments, the computing system 16 may be configured to generate multiple sets of algorithms that may be appropriate for use in certain conditions (e.g., occupancy, road conditions). In such cases, the computing system 16 may receive data, such as data indicative of occupancy of the vehicle 12, road conditions, weather conditions, crime conditions of an area in which the vehicle 12 is located, and the like, via the sensors 30, via the data services 32, and/or via driver inputs or responses to prompts at the console 18, the mobile computing system 20, or the like. Then, the computing system 16 may analyze the data to select the appropriate algorithms from the multiple sets of algorithms, and the computing system 16 may instruct the vehicle control system 14 to control the vehicle 12 in accordance with the selected algorithms and/or the vehicle control system 14 may utilize the selected algorithms to control the vehicle 12 in accordance with the anticipated driver's response and the current conditions (e.g., occupancy, road conditions).

In block 72, in certain embodiments, the computing system 16 may periodically or continuously determine and/or adjust the insurance policy for the vehicle 12 based on the one or more inputs received at block 64 and/or the algorithms that will be used to control the vehicle 12, for example. As discussed above, the insurance cost may increase if the anticipated driver's response and the corresponding generated and/or selected algorithms would likely result in more costly accidents (e.g., in unavoidable accident situations) during operation of the vehicle 12.

At block 74, the computing system 16 provide an indication, such as an indication of an insurance cost, reasons for the insurance cost, steps that may be taken to reduce the insurance cost, generated and/or selected algorithms, detected occupants in the vehicle 12, detected road conditions, weather conditions, and/or other conditions that may affect operation of the vehicle 12 and/or the insurance cost for the vehicle 12. The indication may be provided at certain times (e.g., when the vehicle 12 is turned on), each time the insurance cost changes, each time the insurance cost changes by more than a certain percentage, or continuously, for example. The computing system 16 may provide the indication via a display or speaker within the vehicle 12, via the mobile computing device 20, and/or via any suitable manner, including a vibration provided at the hands, feet, or other body part of the driver, or a combination of the various indications described herein. In this way, the computing system may determine and/or adjust the insurance policy for the vehicle 12, and may provide an indication of the insurance cost and/or change in insurance cost to the driver of the vehicle 12.

In some embodiments, the system 10 may additionally or alternatively carry out some or all of the following steps to control the vehicle 12 and/or determine an insurance policy for the vehicle 12. For example, the driver may access or get into the vehicle 12, and the computing system 16 may provide one or more prompts related to potential driving incidents. The prompts may be related to recent news-based events. The computing system 16 may provide a reward to the driver for answering or providing responses to the prompts (e.g., a chance to win a gift card, an insurance cost discount). The computing system 16 may generate and/or adjust algorithms based on the driver's response to the prompts. The computing system 16 may then instruct the vehicle control system 14 to control the vehicle 12 in accordance with the algorithms and/or the vehicle control system 14 may utilize the algorithms to control the vehicle 12 during operation of the vehicle 12. The computing system 16 may also determine the insurance cost based on the driver's response to the prompts. In some embodiments, the computing system 16 may request additional information, such as prompts for trip details, driving destination, occupants, road conditions, weather conditions, or the like, and/or may provide additional information, such as a recommendation based on the driver's response, such a particular driving route (e.g., a safer driving route rather than a shorter driving route), or the like.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A system for use with an autonomous vehicle, comprising: one or more processors configured to:
   generate an algorithm based on a plurality of inputs indicative of anticipated driver responses to unavoidable driving accident scenarios that have one or more specified conditions comprising an associated crime condition and an associated time of day;
   access data indicative of one or more current conditions of the autonomous vehicle, wherein the one or more current conditions comprise one or more crime conditions for a current location of the autonomous vehicle and a current time of day; and
   in response to an occurrence of a driving situation corresponding to at least one of the unavoidable driving accident scenarios, control the autonomous vehicle using the algorithm to cause the autonomous vehicle to move in accordance with the plurality of inputs, the one or more crime conditions for the current location of the autonomous vehicle, and the current time of day.

2. The system of claim 1, wherein the one or more processors are configured to determine an insurance cost for the autonomous vehicle based on the plurality of inputs and the current time of day.

3. The system of claim 2, wherein the one or more processors are configured to provide an indication of the insurance cost via a display of the autonomous vehicle, a speaker of the autonomous vehicle, a vibration provided by the autonomous vehicle, a mobile computing device, or a combination thereof.

4. The system of claim 1, wherein the one or more processors are configured to update the algorithm on a periodic basis based on one or more new inputs indicative of the anticipated driver responses to the unavoidable driving accident scenarios.

5. The system of claim 1, wherein the
   one or more specified conditions comprise an occupancy of the autonomous vehicle, traffic conditions, road conditions, weather conditions or any combination thereof, and wherein the one or more processors are configured to:
   access additional data indicative of one or more additional current conditions, wherein the one or more additional current conditions comprise at least one of a current occupancy of the autonomous vehicle, current traffic conditions, current road conditions, or current weather conditions; and
   control the autonomous vehicle using the algorithm based on the additional data.

6. The system of claim 1, wherein the one or more processors are configured to:
   generate a plurality of algorithms based on the plurality of inputs, wherein the plurality of algorithms comprises the algorithm, and each algorithm of the plurality of algorithm corresponds to a particular driver of the autonomous vehicle;
   receive an indication of a current driver of the autonomous vehicle; and
   select the algorithm from the plurality of algorithms based on the indication of the current driver.

7. The system of claim 1, wherein the one or more processors are configured to:
   generate a plurality of algorithms based on the plurality of inputs, wherein the plurality of algorithms comprises the algorithm; and
   select the algorithm from the plurality of algorithms based on the one or more current conditions of the autonomous vehicle.

8. A method of controlling an autonomous vehicle, comprising:
   generating, using one or more processors, an algorithm based on a plurality of inputs indicative of anticipated driver responses to unavoidable driving accident scenarios that have one or more specified conditions comprising a corresponding time of day;
   controlling, using the one or more processors, the autonomous vehicle using the algorithm in response to an occurrence of a driving situation predicted to result in damage to the autonomous vehicle;
   dynamically determining over a course of a time period, using the one or more processors, an insurance cost for the autonomous vehicle based on the plurality of inputs and a current time of day; and
   instructing, using the one or more processors, an output device to provide an indication of the insurance cost as the insurance cost is dynamically determined over the course of the time period.

9. The method of claim 8, wherein the corresponding time of day comprises daytime or nighttime, and wherein
controlling, using the one or more processors, the autonomous vehicle using the algorithm in response to the occurrence of the driving situation comprises causing the autonomous vehicle to move in a first way based on the corresponding time of day being the daytime and causing the autonomous vehicle to move in a second way based on the corresponding time of day being the nighttime.

10. The method of claim 8, wherein the one or more specified conditions comprise the current time of day and at least one of an occupancy of the autonomous vehicle, traffic conditions, road conditions, weather conditions, or crime conditions.

11. The method of claim 10, comprising:
accessing, using the one or more processors, data related to at least one of a current occupancy of the autonomous vehicle, current traffic conditions, current road conditions, current weather conditions, or current crime conditions; and
controlling, using the one or more processors, the autonomous vehicle using the algorithm based on the data.

12. The method of claim 8, comprising updating, using the one or more processors, the algorithm on a periodic basis based on one or more new inputs indicative of the anticipated driver responses to the unavoidable driving accident scenarios.

13. The method of claim 12, comprising:
providing, using the one or more processors, a plurality of prompts indicative of the unavoidable driving accident scenarios on the periodic basis; and
receiving, using the one or more processors, the one or more new inputs in response to the plurality of prompts.

14. The method of claim 8, comprising instructing, using the one or more processors, the output device to provide an additional indication of one or more reasons for the insurance cost, one or more factors that if addressed would lower the insurance cost, or both.

15. A non-transitory computer-readable medium comprising computer readable instructions, that when executed by one or more processors, cause the one or more processors to perform operations comprising:
generating an algorithm based on a plurality of inputs indicative of anticipated driver responses to unavoidable driving accident scenarios that have one or more specified conditions comprising a corresponding crime condition and a corresponding time of day;
accessing data indicative of one or more current conditions of an autonomous vehicle, wherein the one or more current conditions comprise one or more crime conditions for a current location of the autonomous vehicle and a current time of day; and
in response to an occurrence of a driving situation involving the autonomous vehicle and corresponding to at least one of the unavoidable driving accident scenarios, controlling the autonomous vehicle using the algorithm to cause the autonomous vehicle to move in accordance with the plurality of inputs, the one or more crime conditions for the current location of the autonomous vehicle, and the current time of day.

16. The non-transitory computer-readable medium of claim 15, wherein the operations comprise:
determining an insurance cost for the autonomous vehicle based on the plurality of inputs; and
providing an indication of the insurance cost via the autonomous vehicle.

17. The non-transitory computer-readable medium of claim 15, wherein the corresponding time of day comprises daytime or nighttime, and wherein
controlling the autonomous vehicle using the algorithm in response to the occurrence of the driving situation comprises causing the autonomous vehicle to move in a first way based on the corresponding time of day being the daytime and causing the autonomous vehicle to move in a second way based on the corresponding time of day being the nighttime.

18. The non-transitory computer-readable medium of claim 17, wherein the operations comprise providing a plurality of prompts indicative of the unavoidable driving accident scenarios, and the plurality of prompts comprise:
one or more first prompts including unavoidable driving accident scenarios occurring during the daytime; and
one or more second prompts including unavoidable driving accident scenarios occurring during the nighttime.

19. The non-transitory computer-readable medium of claim 15, wherein the operations comprise:
generating a plurality of algorithms based on the plurality of inputs, wherein the plurality of algorithms comprises the algorithm, and each algorithm of the plurality of algorithms corresponds to a particular driver of the autonomous vehicle;
receiving an indication of a current driver of the autonomous vehicle; and
selecting the algorithm from the plurality of algorithms based on the indication of the current driver.

20. The non-transitory computer-readable medium of claim 15, wherein the
one or more specified conditions comprise an occupancy of the autonomous vehicle, traffic conditions, road conditions, weather conditions or any combination thereof, and wherein the operations comprise:
accessing additional data indicative of one or more additional current conditions, wherein the one or more additional current conditions comprise at least one of a current occupancy of the autonomous vehicle, current traffic conditions, current road conditions, or current weather conditions; and
controlling the autonomous vehicle using the algorithm based on the additional data.

* * * * *